_United States Patent Office_

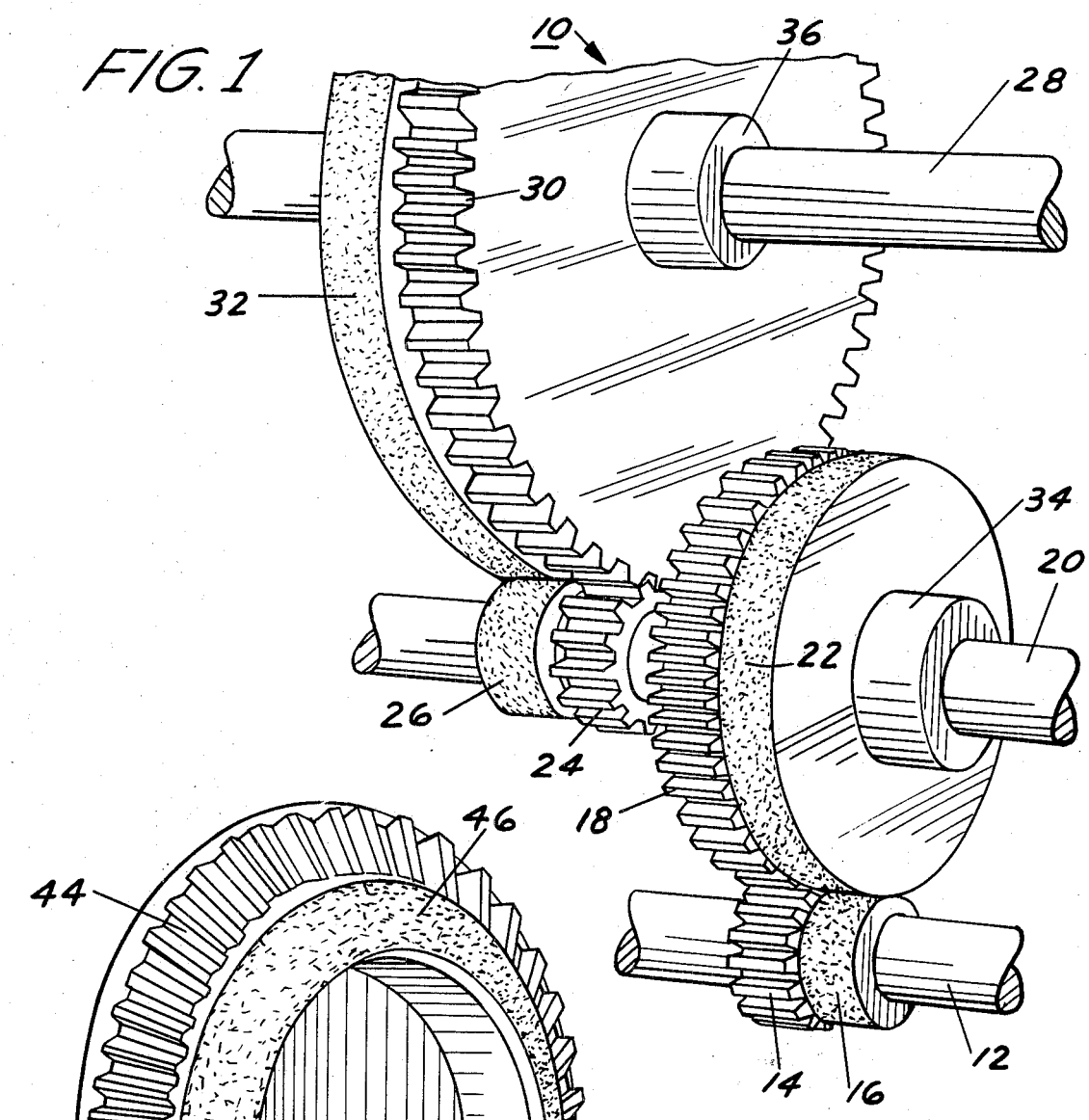
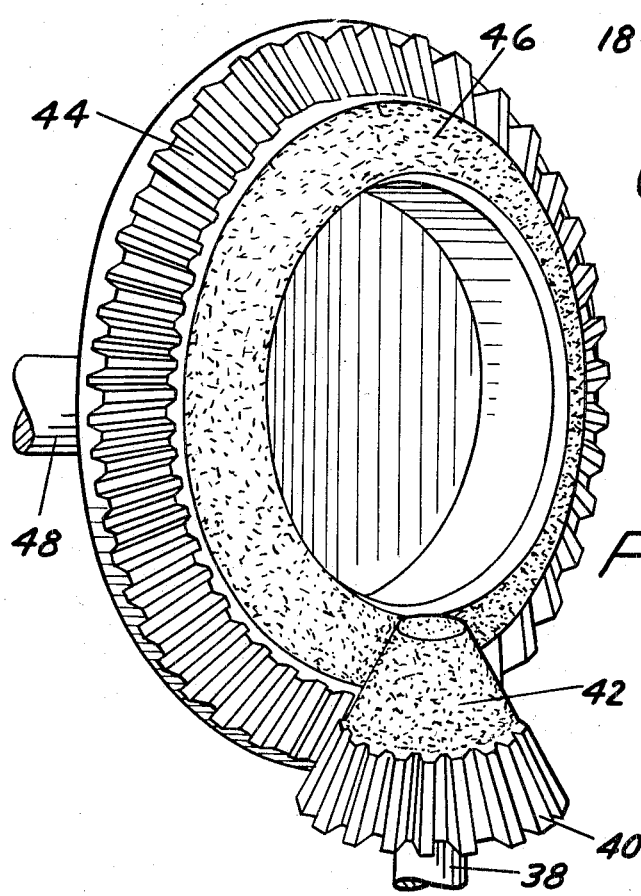

3,548,673
Patented Dec. 22, 1970

3,548,673
ANTIBACKLASH GEAR TRAIN
Anthony J. Suchocki, Rochester, Mich., assignor, by mesne assignments, to the United States of America as represented by the Secretary of the Army
Filed June 17, 1969, Ser. No. 834,102
Int. Cl. F16h 55/18, 1/14, 55/34
U.S. Cl. 74—409       7 Claims

ABSTRACT OF THE DISCLOSURE

A combination toothed gear and friction gear train which alleviates backlash.

---

The present invention relates to an antibacklash gear train and more specifically to a combination toothed and friction type gear train which serves to eliminate backlash.

The problem of backlash in gear drive systems is one well known to those skilled in the mechanical arts. Until now many systems have been devised to cope with this problem, however the most common methods for the elimination of backlash have consisted of introducing shims into the gearing system or selectively assembling precision cut gear teeth. The former solution offers relatively poor results while the latter connection is least costly and time consuming. As an alternative solution, complex gear trains comprising a plurality of friction type gears and belts have been used in an attempt to cure the backlash ill. These solutions like the machinery techniques have proven valuable, but concurrently costly.

It is therefore an object of the present invention to provide a gear train which while providing freedom from the backlash problem is of relatively simple construction, calls for no complex machinery, is easily manufactured without a need for precision cutting techniques, and is low in manufacturing cost.

Other objects and advantages of the present invention will be made clear to those skilled in the art when the following description is considered in relation to the accompanying drawing of which:

FIG. 1 is a perspective view of a spur/gear gear train constructed in accordance with the present invention; and FIG. 2 is a perspective view of a bevel gear gear train constructed in accordance with the present invention.

The no-backlash drive train of the present invention meets these goals by incorporating a friction gear system and a toothed gear system into a single unit.

The friction gear system has the inherent advantage of having no backlash between the driving and driven surfaces, however it concurrently possesses the disadvantage of permitting slippage conditions of heavy load. The toothed gear system does not slip under heavy loads, but has backlash which is necessary to compensate for inaccuracies in the tooth form, in the spacing of teeth and the mounting of the gears. The present invention makes use of the advantages of both types of systems by having a no-backlash train comprising a friction gearing system and a tooth gearing system mounted so they run parallel.

Every gear train has a driving member or driver and a driven member or follower. As shown in FIG. 1, the gear train 10 of the present invention comprises a first shaft 12, having a first toothed gear 14 and a soft surface friction gear 16 mounted thereon. Rotatably engaged with said first toothed gear 14 is a second toothed gear 18 which is mounted on a second shaft 20. Soft surface friction gear 16 is in rotating frictional engagement with bevel surface friction gear 22 which is similarly mounted on second shaft 20. Thus when driving shaft 12 is power rotated both toothed gear 14 and friction gear 16 rotatably engage therein respective partners toothed gear 18 and friction gear 22 causing shaft 20 to rotate in the opposite direction. As shown in the drawing, a second gear train may be added to the first either to rectify the direction of the transmitted motion or to alter the velocity thereof. In this instance shaft 20 becomes the driving shaft with first toothed gear 24 and soft surface friction gear 26 mounted thereon while shaft 28 having a second toothed gear 30 and hard surface friction gear 32 mounted thereon is the driven shaft.

In the drawing, the various gears are secured in place on their respective shafts by means of collars 34 and 36. In actual practice however, such mounting may be accomplished using any conventional technique.

Further, although the friction and toothed gears are shown in the drawing as being mounted very close together on their respective shafts, they can be separated by reasonable distances, allowing for torsional bending, etc., of the respective shafts, or actually welded together or formed from a common core with the different surfaces formed thereon. The closer the two types of gears, the better their cooperation and hence close mountings or unitized construction is preferred.

The use of a soft surface friction gear or the driver and a hard surface friction gear as the following member of the friction gear train represents the application of conventional gearing techniques. The soft surface frictional gear or driving friction member may have a surface of, for example, polyurethane or some other polymeric material having high durability and a high coefficient of friction or any other suitable high friction material. The hard surface frictional gear or driven friction member may have a surface of cast iron, aluminum or some similar hard frictional surface conventionally used in friction gear applications.

FIG. 2 shows an alternative embodiment of the present invention in which the concept of this invention is applied to a bevel gear gear train. In this embodiment, drive shaft 38 has a first toothed bevel gear 40 and a soft surface friction gear 42 mounted thereon. The gears 40 and 43 are in rotating engagement with their respective counterparts, toothed bevel gear 44 and hard surface friction gear 46, which are mounted on driven shaft 48. The materials utilized to construct this gear system are the same as or similar to those described above, and the principles applicable to the operation thereof are likewise the same.

The materials used in the various other components of the system such as the shaft and tooth gears are those conventionally used in such applications.

The gear teeth need not be cut to any precise standards, although even in this type of system greater precision yields increased returns.

The various gears which engage each other may be of the same or different widths depending upon the application to which the invention is applied.

I wish it to be understood that I do not desire to be limited to the exact details of construction shown and described, for obvious modifications will occur to a person skilled in the art.

I claim:
1. An antibacklash gear train comprising at least one driving member and at least one driven member, each of said driving members having a drive shaft, a first toothed gear and a first friction gear mounted on said drive shaft, each of said driven members having a driven shaft, a second toothed gear and a second friction gear mounted on said driven shaft, said first toothed gear being engaged with said second toothed gear simultaneously as said second friction gear is in driven frictional engagement with said first friction gear.

2. An antibacklash gear train in accordance with claim 1 wherein said first friction gear is a soft surface friction gear and said second friction gear is a hard surface friction gear.

3. An antibacklash gear train in accordance with claim 2 wherein said soft surface friction gear has a diameter slightly larger than the pitch circle of said first toothed gear, and said hard surface friction gear has a diameter equal to the pitch circle of said second toothed gear.

4. An antibacklash gear train in accordance with claim 3 wherein said soft surface friction gear has a surface of a polymeric material having a high coefficient of friction.

5. An antibacklash gear train in accordance with claim 4 wherein said polymeric material having a high coefficient of friction is polyurethane.

6. An antibacklash gear train in accordance with claim 3 wherein said first toothed gear and said soft surface friction gear are joined to form a single unit in two portions, and said second toothed gear and said hard surface friction gear are joined to form a single unit in two portions.

7. An antibacklash gear train in accordance with claim 3 wherein said first and second toothed gear, said soft surface friction gear and said hard surface friction gear are bevel gears.

References Cited

UNITED STATES PATENTS

| | | | |
|---|---|---|---|
| 569,013 | 10/1896 | Altham | 74—410 |
| 2,880,625 | 4/1959 | Thomas | 74—440 |

LEONARD H. GERIN, Primary Examiner

U.S. Cl. X.R.

74—214, 215, 417, 423, 432